US008837525B2

(12) United States Patent
Wang

(10) Patent No.: US 8,837,525 B2
(45) Date of Patent: Sep. 16, 2014

(54) CARRIER-PHASE DIFFERENCE DETECTION AND TRACKING IN MULTIPOINT BROADCAST CHANNELS

(76) Inventor: Xiao-an Wang, Allentown, PA (US)

( * ) Notice: Subject to any disclaimer, the term of this patent is extended or adjusted under 35 U.S.C. 154(b) by 513 days.

(21) Appl. No.: 13/052,691

(22) Filed: Mar. 21, 2011

(65) Prior Publication Data

US 2012/0243424 A1  Sep. 27, 2012

(51) Int. Cl.
| | | |
|---|---|---|
| *H04J 1/00* | (2006.01) | |
| *H04L 25/03* | (2006.01) | |
| *H04L 27/26* | (2006.01) | |
| *H04L 5/14* | (2006.01) | |
| *H04B 7/02* | (2006.01) | |
| *H04L 5/00* | (2006.01) | |
| *H04W 48/08* | (2009.01) | |
| *H04W 24/00* | (2009.01) | |
| *H04L 25/02* | (2006.01) | |
| *H04B 7/06* | (2006.01) | |

(52) U.S. Cl.
CPC ......... *H04L 25/03955* (2013.01); *H04L 5/0048* (2013.01); *H04L 25/03904* (2013.01); *H04W 48/08* (2013.01); *H04L 5/0023* (2013.01); *H04W 24/00* (2013.01); *H04L 27/2646* (2013.01); *H04L 25/0228* (2013.01); *H04L 27/2695* (2013.01); *H04L 5/0035* (2013.01); *H04L 25/0204* (2013.01); *H04L 27/2675* (2013.01); *H04L 27/2657* (2013.01); *H04L 5/14* (2013.01); *H04B 7/024* (2013.01); *H04B 7/0626* (2013.01)

USPC .......................................................... 370/480

(58) Field of Classification Search
None
See application file for complete search history.

(56) References Cited

U.S. PATENT DOCUMENTS

| | | | |
|---|---|---|---|
| 7,242,961 B2 | 7/2007 | Hansen | |
| 7,747,250 B2 | 6/2010 | Larsson et al. | |
| 7,778,607 B2 | 8/2010 | Withers, Jr. et al. | |
| 7,830,980 B2 | 11/2010 | Li et al. | |
| 2008/0070615 A1* | 3/2008 | Obuchi et al. | 455/522 |
| 2009/0052357 A1* | 2/2009 | Suo et al. | 370/280 |

* cited by examiner

*Primary Examiner* — Minh-Trang Nguyen

(57) ABSTRACT

Methods and apparatus are described that provide carrier-phase difference (CPD) acquisition via signaling protocols between communicating devices. The random CPD between two disjoint devices can be measured by the signaling protocols described herein. With the availability of the CPD, a device is also able to acquire its outgoing channel (transmit channel) information, thus avoiding the channel information feedback that is being considered and/or practiced in some wireless communications systems. Also described are methods and apparatus that use the CPD to synchronize the clocks of two or more devices and that track the time-variations of the CPD for reliable CPD measurement and tracking loop operations. Applications of the described methods and apparatus include wireless multipoint broadcast systems, also known as coordinated multipoint transmission, or CoMP, in LTE (long-term evolution)-advanced systems, point-to-point wireless MIMO systems, and general wireless device networks.

31 Claims, 12 Drawing Sheets

CARRIER-PHASE DIFFERENCE DETECTION AND TRACKING IN MULTIPOINT BROADCAST CHANNELS

BACKGROUND

1. Field of Application

The following description relates generally to telecommunications systems and wireless communications systems.

2. Prior Art

A typical wireless cellular network comprises many cells, with one or more base stations at each cell. A mobile user within a cell communicates with its serving base station of the cell. Since the locations of mobile users within a cell are random, the quality of the channel between a mobile user and its serving base station can vary significantly. For example, consider the two mobile users 120 and 122 in FIG. 1. Both mobile users 120 and 122 are in the same cell served by base station 112. Mobile user 120 is very close to base station 112, thus the quality of the channel between mobile user 120 and base station 112 can be fairly good. High data throughput can be achieved between mobile user 120 and base station 112.

On the other hand, mobile user 122 is at the edge of its serving cell and much further away from base station 112. In the downlink channel in which base station 112 sends signal to mobile user 122, the strength of the downlink signal that mobile user 122 receives attenuates more due to the increased distance. Further, since mobile user 122 is also closer to neighbor cells, it is also subjected to much stronger interferences of the signals from base stations 114 and 116 of neighbor cells. Consequently, the downlink channel quality can be very poor at the cell edge. In the uplink channel where mobile user 122 sends signal to base station 112, the uplink signal of mobile user 122 is also corrupted by other mobile users 124 and 126 in neighbor cells. Thus at the cell edge, the uplink channel quality can also be very poor. As a result, the data throughput at the cell edge can be much lower than the peak data rate achievable when a mobile user is in the very proximity of a base station. The low data throughput at the cell edge averages down the overall data throughput of the entire cell, thus significantly reducing the network performance.

Recently, in an effort to improve the network performance in terms of the data throughput, multipoint broadcast or multipoint transmission schemes have been introduced to wireless cellular networks. Refer to FIG. 1, where mobile user 122 is connected to base station 112, mobile user 124 to base station 114, and mobile user 126 to base station 116. Without the multipoint transmission, each base station would communicate to its respective mobile user individually. Thus for mobile user 122, the signals it hears from base stations 114 and 116 appear as noises or interferences. If, as shown in FIG. 1, mobile user 122 is at the cell edge, then the interferences from base stations 114 and 116 can be much stronger than the signal from base station 112, and consequently mobile user 122 suffers much poorer communication quality, resulting in much lower data throughput.

A multipoint broadcast scheme aims at increasing the cell-edge performance and can be described as follows. Refer to FIG. 1 where an example multipoint broadcast system can be identified. Base stations 112, 114, and 116 form a set of collaborating multipoint broadcasters. Mobile users 122, 124, and 126 form a set of recipients in the multipoint broadcast system. In the multipoint broadcast system in FIG. 1, base stations 112, 114, and 116 transmit the combinations of the signals intended for mobile users 122, 124, and 126. For each base station, the combination "weight" for each mobile user signal can be different. Through elaborate algorithms, the signals are combined at each base station in such a way that when the transmitted signals from base stations 112, 114, and 116 arrive at mobile user 122, the signals for mobile users 124 and 126 are cancelled out or minimized, while the signal for mobile user 122 is maximized or enhanced, thus the signal quality of mobile user 122 improves significantly. Similarly, mobile users 124 and 126 will also see significant improvement in the quality of their respective signals. The combining of the signals at each base station is commonly referred to as "pre-coding". The combining weights for each mobile-user signal and for each base station constitute the elements in a so called "pre-coding matrix".

The signals from base stations in a cellular network are broadcast in nature. Thus a multipoint transmission scheme creates a set of multipoint broadcast channels. With the ability to completely cancel the interference, and to create clean channels for each mobile user, multipoint broadcast channels are shown to have a capacity, a measure of the data throughput of the network, several times that of the traditional cellular networks. Multipoint transmission schemes have been adopted by advanced versions of LTE (long-term evolution, of the currently deployed third generation wireless cellular networks), under the name of "coordinated multipoint transmission", or CoMP. The name follows from the fact that neighboring base stations coordinate to achieve multipoint broadcast.

While multipoint broadcast can bring tremendous benefits to wireless cellular networks, its performance depends critically on availability of the downlink-channel information at the collaborating base stations. Consider the downlink multipoint broadcast in FIG. 1. For the purpose of interference cancellation, each of the base stations must have the channel information on all downlink channels between a base station and a mobile user. Since there are three base stations and three mobile users involved, there are nine such channels in total in the multipoint broadcast system in FIG. 1. How the base stations get the downlink-channel information depends on the duplex pattern between the uplink and the downlink of the network.

Two duplex patterns exist in cellular networks. One is frequency-division duplex (FDD). In FDD, the uplink and the downlink are assigned to two different frequency bands, and are active simultaneously. This is illustrated in FIG. 2. The other duplex pattern is time-division duplex (TDD). In TDD, the uplink and the downlink share the same frequency band, so in time domain, the uplink and the downlink are active in a non-overlapping or an alternating fashion. This is illustrated in FIG. 3. There also exists the concept of single-channel, full-duplex wireless systems, in which full duplex communications between two wireless devices (a base station and a mobile user, for example) take place in one single frequency band. Its widespread use, however, may still have to wait until certain critical issues, such as self-interference cancellation and limited dynamic range, can be successfully solved in practice.

In an FDD wireless network, a base station is able to estimate the uplink channels from the signals of mobile users which it serves, while a mobile user is able to estimate the downlink channels from the signals of serving base stations. The uplink and downlink channels are generally different since they are in different frequency bands, so the downlink channel is typically considered to be unknown to base stations. To enable multipoint transmission, each mobile user has to feedback the downlink-channel information to the serving base stations via uplink channels. The data rate required for the feedback, however, can be extremely high, which takes up a significant, and, in many cases, a majority portion of the uplink channel capacity. Such a loss in uplink capacity diminishes or even negates the benefits of multipoint transmission.

Moreover, the feedback data needs to be reliably recovered by the base station. Strong error-control coding will have to be applied to the data carrying the channel information. The operations of coding and decoding will introduce coding/decoding delays. The stronger the code in error-correcting capability, the longer the delay. If the channel changes during the coding and decoding, the channel data received by base stations will be outdated.

In a TDD wireless network, the uplink and the downlink share the same frequency, therefore the uplink channel and downlink channel are closely related. Assuming the base stations and the mobile users have phase-synchronized carriers, i.e., the phase difference between the carriers of the base station and the mobile user is zero, then the uplink and the downlink channels are identical (this also applies to the case of non-zero but known phase difference between the carriers, since the uplink and downlink channels can be made to be identical by de-rotating the known phase difference). When the base station estimates the uplink channel, the downlink channel becomes available automatically. Due to the mobile nature of the cellular network, the channels change over time. So strictly speaking, the uplink and the downlink channel are not exactly identical since the uplink and the downlink transmission occur at different times, as shown in FIG. 3. However, if the cycle of uplink and downlink pattern is relatively short compared to the rate of change of the wireless channels, as is typically the case, the difference between the uplink and the downlink channels will be so small so that the uplink and the downlink channels can be considered to be the same.

Since a base station can only estimate the uplink channels from the mobile users which it connects, each base station in a multipoint broadcast system will exchange the estimated channel information with other collaborating base stations. The exchange typically takes place via high-speed backbones that connect all base stations, such as Ethernet or optical fiber. For example, in FIG. 1, base station 112 estimates uplink channels between base station 112 and mobile user 122, between base station 112 and mobile user 124, and between base station 112 and mobile user 126. Base station 112 will send information on the above channels to base stations 114 and 116, and will receive information on other channels between the mobile users and base stations 114 and 116 from base stations 114 and 116, respectively. The exchange is conducted via high-speed backbone connection 110. After the exchange, each base station will have the same global channel information for forming the pre-coding matrix for multipoint transmission.

In practice, however, the phase difference between the carrier of a base station and the carrier of a mobile user always exists and is random. Thus the uplink channel observed by the base station and the downlink channel observed by the mobile user are no longer the same. One way for the base station to acquire the downlink-channel information is the mobile-user feedback via the uplink channel, as is the case in a FDD wireless network. The feedback overhead on the uplink channel, however, diminishes the uplink capacity even more in a TDD network, since with TDD the uplink capacity has already been reduced by the shared downlink. Channel feedback also suffers from the coding and decoding delay as it does in FDD.

There are sophisticated and expensive approaches that force the base station and the mobile user to be locked in phase. For example, all base stations and mobile users can be synchronized with a GPS (Global Positioning System) reference signal. However, this would require high quality, and therefore high cost, RF (radio frequency) components, and elaborate signal processing algorithms. The added size, cost, and power consumption make it infeasible for a mobile-user device that has strict limitations on size, cost, and power consumption. Further, GPS-based synchronization requires direct line-of-sight signals from multiple GPS satellites, which are often blocked by buildings, trees, etc., therefore consistent performance is not guaranteed.

SUMMARY OF THE INVENTION

The following is a summary of one or more aspects in order to provide a basic understanding of such aspects. Its purpose is to present some concepts of one or more aspects in a simplified form as a prelude to the more detailed descriptions that are presented later.

In accordance with one or more embodiments and the corresponding disclosure thereof, various aspects are described in connection with detecting the carrier-phase difference (CPD) between two wireless devices. Consider a base station and a mobile user in a TDD network. In an example signaling protocol, the mobile user transmits a first training (or pilot) signal for the base station to estimate the uplink channel, and the base station transmits a training signal for the mobile user to estimate the downlink channel. The mobile station then transmits a second training signal, compensated by the phase of the downlink channel, to the base station. The base station uses the second training signal from the mobile user to detect the CPD. Alternatively, the mobile user can also transmit to the base station the phase of the estimated downlink channel for the base station to detect the CPD.

Another aspect relates to the multipoint transmission in a wireless network, whose duplex pattern can be TDD or hybrid TDD/FDD. A set of base stations can be formed to create a set multipoint broadcast channels for a set of mobile users. The base stations in the broadcasting set obtain information on a set of downlink channels by first detecting the corresponding set of CPDs from a predetermined signaling protocol. Then the detected set of CPDs is applied to the corresponding set of uplink channels obtained by the base stations, to obtain the set of the downlink channels. Finally, each base station applies the set of downlink channels to compute the combining weight for each mobile user signal so that when the combined signal reaches to a mobile user, the mobile-user's own signal will be enhanced while other mobile-users' signal will be reduced or completely cancelled.

Yet another aspect relates to a wireless communication apparatus. In a wireless MIMO (multiple inputs multiple outputs) system, two wireless subsystems, each equipped with multiple antennas, can communicate with each other. For one subsystem, the MIMO channel it uses to transmit data to the other subsystem is referred to as its "transmit" channel and the MIMO channel it uses to receive data from the other subsystem is referred to as its "receive" channel. Each wireless subsystem can obtain the information on its transmit channel from a predetermined signaling protocol, and apply thus-obtained transmit-channel information to pre-coding of the signals according to various criteria.

Yet another aspect relates to a wireless communications apparatus. A system of wireless devices can use the detected CPD to synchronize their clocks. The CPD can be used to drive a phase-locked loop (PLL) or a frequency-locked loop (FLL), so the clocks of the wireless devices within the system can be phase- or frequency-synchronized.

Still another aspect relates to an apparatus and/or a computer program product. The apparatus and/or the computer program collect a set of measurements for CPD, and use various combinations to produce the final detection of the CPD, according to various criteria. Moreover, a sequence of the detected CPD can be filtered to have more reliable detection and to keep track of the time variation of the CPD. Further, the time variation of the CPD may be modeled with a set of parameters. Thus tracking the time-varying CPD can be equivalently done by estimating and tracking the parameters in the CPD model. Estimating and tracking a limited number of parameters in the parametric model of the random CPD signal can be more reliable than tracking the random CPD signal itself, thus allowing more accurate CPD estimates to be reconstructed from the model.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
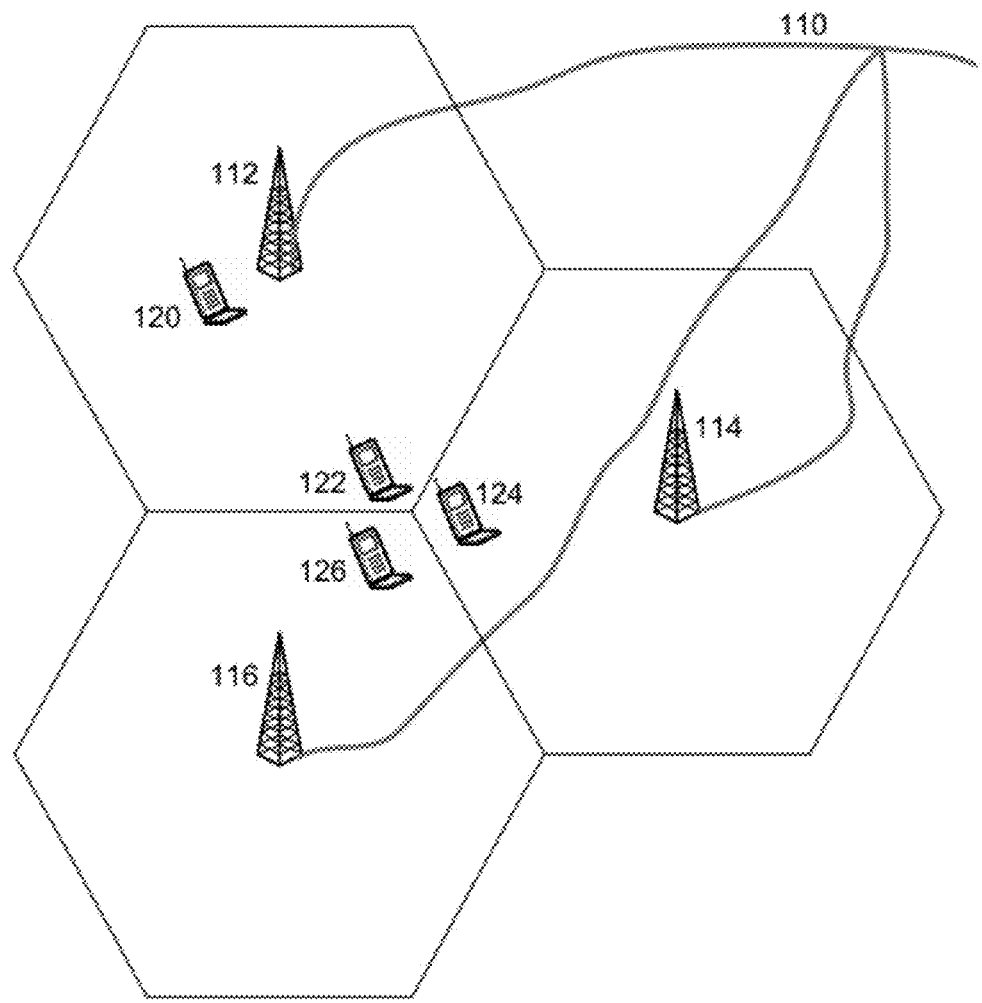
FIG. 1 illustrates a wireless cellular network that comprises a multipoint broadcast system.

The disclosed subject matter is described with reference to the drawings, wherein like reference numerals are used to refer to like elements throughout the description. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram or schematic form in order to facilitate describing the subject innovation.

Various terms are used to describe counterparts that are communicating with each other in various wireless networks. For example, in a wireless cellular network, "base station" and "mobile user" are used. As another example, in a point-to-point wireless MIMO system, the term "subsystem" is used for either of the two communicating counterparts, which can be symmetric or asymmetric. While it is more descriptive to use terms that are specific to a wireless network of a special kind, sometimes it is desirable to use more generic terms for more precise descriptions, as in some aspects that covers more than one type of wireless network. To this end, terms "reference devices" and "non-reference devices" are used to refer to communicating counterparts, in addition to the above specific terms. The distinction between a reference device and a non-reference device is that a non-reference device can derive the desired information described herein from the signals sent from the reference device according to a predetermined signaling protocol. In a wireless cellular network, a base station is a non-reference device, and a mobile user is a reference device. Accordingly, the channel from a non-reference device to a reference device is referred to as the "downlink" channel, and the channel from a reference device to a non-reference device is referred to as the "uplink" channel. For a point-to-point wireless MIMO system, the distinction may be immaterial so one subsystem can be designated as a non-reference device and the other subsystem as a reference device, or vice versa.

A multipoint broadcast or a multipoint transmission system in a wireless communications network requires availability of downlink-channel information at collaborating base stations. Such information can be fed back to the base stations by the mobile users using the uplink channel. The feedback overhead, however, can significantly diminish the uplink capacity, especially for TDD wireless networks. Moreover, the feedback delay due to coding and decoding may render the downlink-channel information outdated when it reaches base stations, if the channel is rapidly varying.

Another approach is to phase-synchronize the base station and the mobile user via an accurate common reference, such a GPS reference. For a synchronized pair of a base station and a mobile user in a TDD network, the uplink and the downlink are identical (up to a known phase offset), so the base station can acquire the downlink-channel information by estimating the uplink channel from the signals transmitted by the mobile user. However, to phase-synchronize the base station and the mobile user requires expensive RF components and sophisticated signal processing, making it impractical for a mobile device that has to be low-power, inexpensive, and small in size. Further, synchronization with GPS signals requires multiple direct, line-of-sight signals from GPS satellites, which may not be available when a mobile user is indoors, on city streets, under a tree, etc. Therefore such an approach does not guarantee a consistent quality of service (QoS).

Carrier-Phase Difference (CPD) Detection

Figure 4:
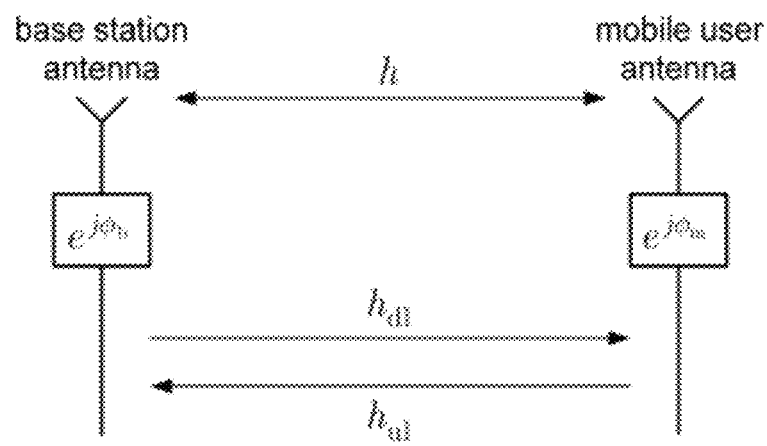
FIG. 4 illustrates the relationship between the downlink channel, the uplink channel, and the carrier phases in a TDD wireless system.

FIG. 4 illustrates the relationship between the downlink channel $h_{dl}$, the uplink channel $h_{ul}$, and the carrier phase $\phi_b$ of a base station, and the carrier phase $\phi_m$ of a mobile user, where the base station and the mobile user share the same frequency, as is in a TDD wireless communications system. Ignoring the phase difference between the modulation (transmitter) path and the demodulation (receiver) path, the above quantities are related as follows:

$$h_{dl} = e^{j(\phi_b - \phi_m)} h$$

$$h_{ul} = e^{j(\phi_m - \phi_b)} h \quad (1)$$

where h is the channel between the base station antenna and the mobile user antenna. In FIG. 4, h is assumed to be a scalar for brevity. However, it is to be understood that the description herein can be extended in a straightforward manner to a matrix channel, e.g., an MIMO channel when more than one antenna has been employed in a base station and/or a mobile user.

Note that for a narrowband channel, such as a subcarrier in an LTE network, the channel is flat in frequency domain, thus h represents the channel gain at the subcarrier frequency. For a wideband channel where the channel gain varies at different frequencies, h is a function of the frequency f: h=h(f).

From Eq. (1), the downlink channel and the uplink channel are related by $$h_{dl} = e^{j2(\phi_b - \phi_m)} h_{ul} \quad (2)$$

From Eq. (2), it is clear that if the CPD, the carrier-phase difference $\Delta\phi = \phi_b - \phi_m$, between the base station and the mobile user is known, the downlink channel can be recovered from the knowledge of the uplink channel. In other words, to derive the downlink-channel information from the uplink-channel information, the CPD has to be detected first.

Figure 5:
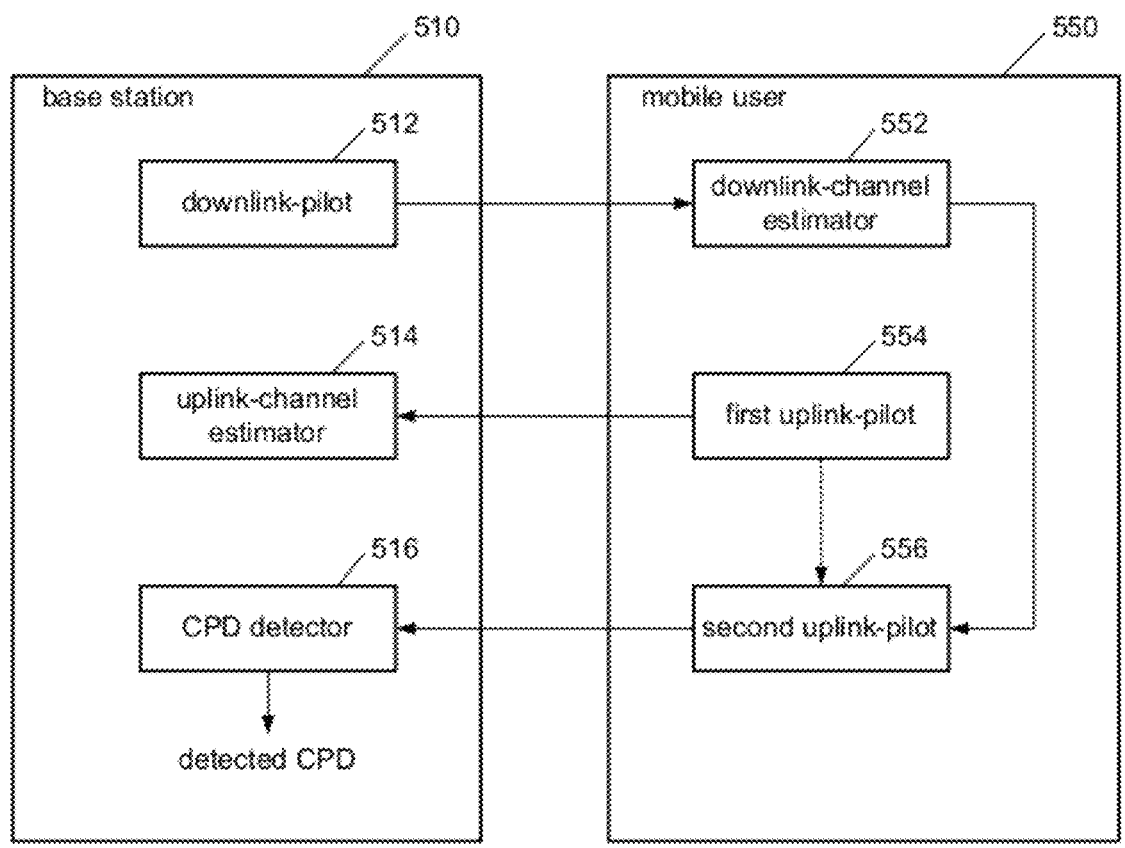
FIG. 5 illustrates an example system that uses an exemplary signaling protocol for CPD detection.

FIG. 5 illustrates an example system that utilizes an exemplary signaling protocol to detect the CPD. In FIG. 5, base station 510 comprises downlink-pilot apparatus 512, uplink-channel estimator 514, and CPD detector 516. The term "pilot" hereinafter has the same meaning as the terms "training signal", "reference signal", and the like, describing a signal known to devices on both ends of a communication link for the purpose of estimating the channel. When a pilot needs to be processed before being transmitted, the pilot prior to processing is referred to as the "base" pilot. Mobile user 550 comprises downlink-channel estimator 552, first uplink-pilot apparatus 554, and second uplink-pilot apparatus 556. Downlink-pilot apparatus 512 transmits the downlink-pilot that is received by downlink-channel estimator 552, where the downlink channel $h_{dl}$ is estimated. First uplink-pilot apparatus 554 transmits a first uplink-pilot $P_1$, which is the same as the first "base" uplink-pilot $Q_1$, i.e., $P_1 = Q_1$. Uplink-channel estimator 514 receives and uses the first uplink-pilot to estimate the uplink channel $h_{ul}$. Second uplink-pilot apparatus 556 generates a second uplink-pilot $P_2$ by de-rotating the second "base" uplink-pilot $Q_2$ with the phase of the estimated downlink channel:

$$P_2 = \frac{\hat{h}_{dl}^*}{|\hat{h}_{dl}|} Q_2 \quad (3)$$

where $\hat{h}_{dl}$ is the estimate of downlink channel $h_{dl}$, $|\hat{h}_{dl}|$ is the amplitude of $\hat{h}_{dl}$, and $\hat{h}^*_{dl}$ is the conjugate of $\hat{h}_{dl}$. A convenient choice for $Q_2$ is that $Q_2 = Q_1$, so that only one base uplink-pilot is used in the signaling protocol. If $Q_2 = Q_1$ is so chosen, the dashed line for the signal flow from first uplink-pilot apparatus 554 to second uplink-pilot apparatus 556 will indicate the dependence of second uplink-pilot on the first uplink-pilot. At the end of the signaling protocol, CPD detector 516 receives the second uplink-pilot from the uplink channel, and detects the CPD.

Figure 6:
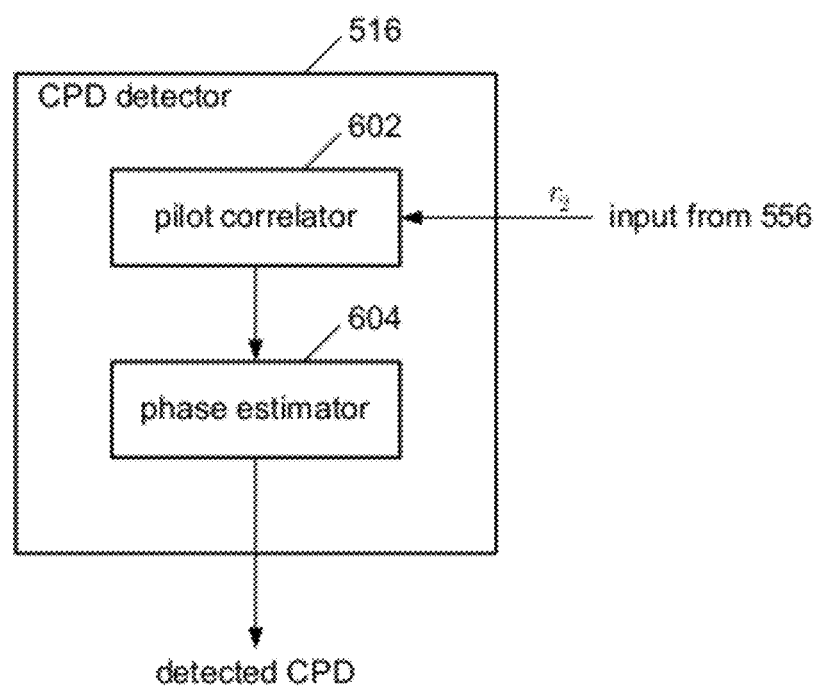
FIG. 6 illustrates an example procedure for detecting the CPD.

FIG. 6 illustrates an example procedure for detecting the CPD. CPD detector 516 comprises pilot correlator 602 and phase estimator 604. Pilot correlator 602 receives second uplink-pilot from second uplink-pilot apparatus 556. The received second uplink-pilot signal $r_2$ at the input of pilot correlator 602 can be written as $$r_2 = h_{ul} P_2 = \frac{h_{ul} \hat{h}_{dl}^*}{|\hat{h}_{dl}|} Q_2 \quad (4)$$

Pilot correlator 602 removes the second base uplink-pilot $Q_2$ by correlating the received second uplink-pilot with the second base uplink-pilot. This can be expressed mathematically as (with proper normalization)

$$r_2 \frac{Q_2^*}{|Q_2|^2} = \frac{h_{ul} \hat{h}_{dl}^*}{|\hat{h}_{dl}|} \frac{Q_2 Q_2^*}{|Q_2|^2} = \frac{h_{ul} \hat{h}_{dl}^*}{|\hat{h}_{dl}|} \quad (5)$$

Phase estimator 604 first estimates the phase of the output of pilot correlator 602, i.e., the phase of Eq. (5). Ignoring the error from the downlink-channel estimation, or equivalently, assuming $\hat{h}^*_{dl} = h_{dl}$, and utilizing Eq. (2), the phase of Eq. (5) can be written as $$\angle\left(r_2 \frac{Q_2^*}{|Q_1|^2}\right) = \angle\left(\frac{h_{ul} \hat{h}_{dl}^*}{|\hat{h}_{dl}|}\right) = 2(\phi_m - \phi_b) \quad (6)$$

which is twice the negative value of the CPD. In other words, the detected CPD value is half of the negative phase of Eq. (5). Phase estimator 604 then outputs the detected CPD.

It is to be understood that depending on implementations, phase estimator output may be of form $k(\phi_b - \phi_m)$, or $e^{jk(\phi_b - \phi_m)}$, where k is a constant. Examples of k includes k=±1 and k=±2. The scope of the subject disclosure, however, is not limited to those example values.

In some wireless devices, the transmitter (Tx) path and the receiver (Rx) path of a wireless device may have different delays that originate from the different signal processing algorithms, modules, and/or apparatus, including modulation and demodulation, in the Tx path and the Rx path. For a base station and a mobile user both of which having different delays in the Tx path and the Rx path, CPD detection can be generalized as follows. Note that a delay in a signal path introduces an additional phase offset. Let $\phi_{b,dl}$, $\phi_{b,ul}$, $\phi_{m,ul}$, and $\phi_{m,dl}$ be the phase offsets due to delays of base station Tx path, base station Rx path, mobile user Tx path, and mobile user Rx path, respectively. Eqs. (1) and (2) can be generalized as $$h_{dl} = e^{j(\phi_b + \phi_{b,dl} + \phi_{m,dl} - \phi_m)} h$$

$$h_{ul} = e^{j(\phi_m + \phi_{m,ul} + \phi_{b,ul} - \phi_b)} h \quad (7)$$

and $$h_{dl} = e^{j(2\phi_b - 2\phi_m + \phi_{b,dl} - \phi_{b,ul} + \phi_{m,dl} - \phi_{m,ul})} h_{ul} \quad (8)$$

Accordingly, $$\angle\left(r_2 \frac{Q_2^*}{|Q_2|^2}\right) = \angle\left(\frac{h_{ul} \hat{h}_{dl}^*}{|\hat{h}_{dl}|}\right) = 2(\phi_m - \phi_b) + \phi_{b,dl} - \phi_{b,ul} + \phi_{m,dl} - \phi_{m,ul} \quad (9)$$

Compared with Eq. (6), Eq. (9) consists of two components: one is contributed by the "true" CPD, and the other contributed by the difference in delays of Tx and Rx paths of the base station and the mobile user. Depending on applications, there are two cases to be considered. In the first case, an application requires to detect the true CPD only. Since the delays of Tx and Rx paths in a wireless device are either fixed, or measureable, the phase due to the delay difference in Tx and Rx paths is readily available. Thus such an additional phase can be removed from the output of phase estimator 604, leaving only the true CPD component. In the second case, it is the entire output of phase estimator that an application is interested in. For example, the multipoint transmission described later belongs to this second case. Thus in the second case, the Eq. (9) can be considered to represent a "generalized" CPD. It is clear that in both cases, the phase due to the delay difference in Tx and Rx paths makes no substantial difference in the operations of phase estimator 604. In other words, the presence of unequal delays in Tx and Rx paths does not principally alter the principle of CPD detection described herein. Thus the descriptions hereinafter of various aspects apply to both equal and unequal delays in Tx and Rx paths.

The first and the second uplink-pilot signals can be either time-multiplexed or parallelized. For example, in LTE systems, certain subcarriers are allocated to carry the pilot signals. Those subcarriers can be time-multiplexed to carry the first and the second uplink-pilot signals (i.e., the subcarriers carry the first and second uplink signals in an alternating pattern). Alternatively, the first and the second uplink-pilot signals can be carried on different sets of pilot subcarriers in parallel. This will have the advantage of reducing signaling time. When the first and the second uplink-pilots are carried on different sets of subcarriers, however, caution is needed to ensure that frequency separation between two subcarriers carrying a first uplink-pilot and the companion second uplink-pilot is sufficiently close so that the two subcarriers can be considered to undergo one same wireless channel. As another example, consider a wireless system using the spread spectrum, such as CDMA (code-division multiple access). Typically in a spread-spectrum system, a code channel is allocated to carry the pilot signal. Such a code channel can be time-multiplexed to carry the first and the second uplink-pilot signals. Alternatively, the first and the second uplink-pilot signals can be carried on two orthogonal code channels in parallel.

Note that in the foregoing example, base station 510 detects CPD by processing the received second uplink-pilot, and the received first uplink-pilot is not used for CPD detection. Thus in the above example, the transmission of the first uplink-pilot by first uplink-pilot apparatus 554 at mobile user 550 can be skipped from the foregoing example signaling protocol. Accordingly operations of uplink-channel estimator 514 at base station 510 can also be skipped. It will be appreciated, however, that operations of first uplink-pilot apparatus 554 and uplink-channel estimator 514 may be needed in other example signaling protocols to be described later.

Figure 7:
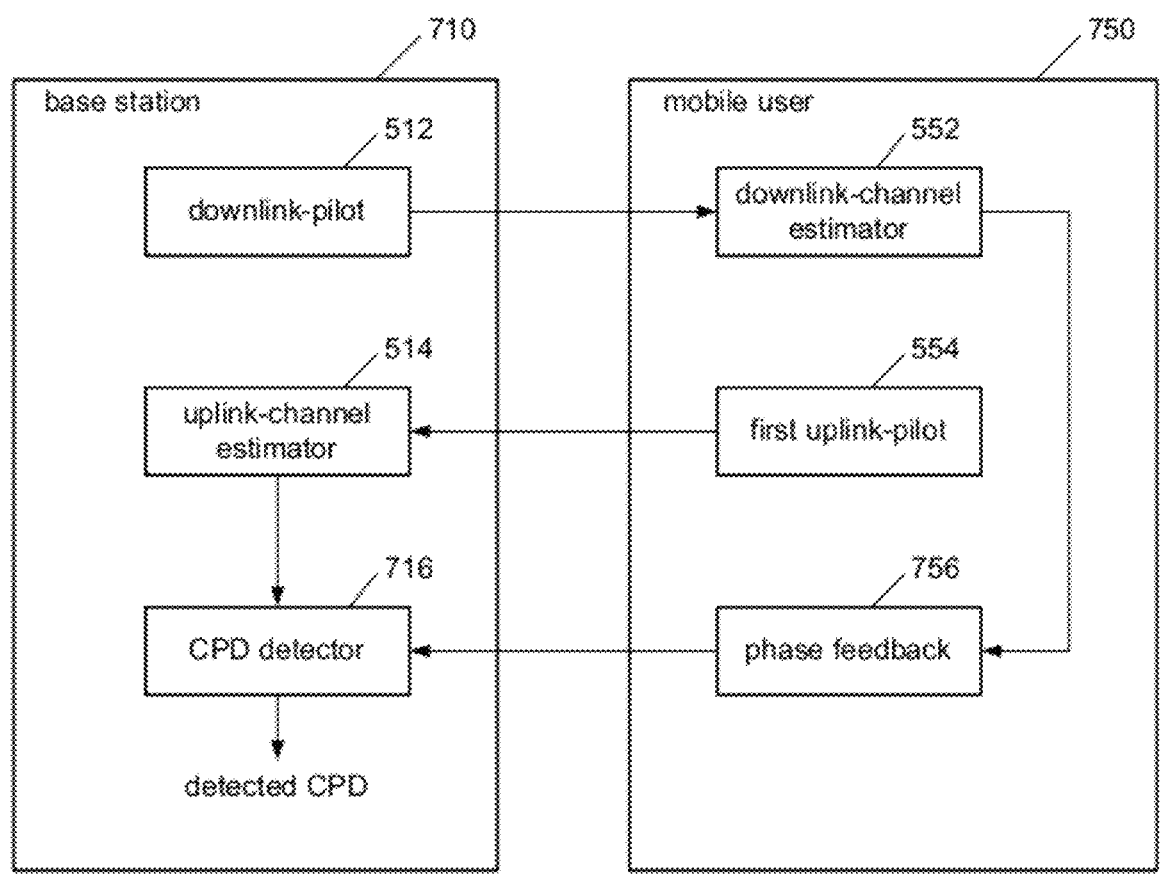
FIG. 7 illustrates an example system that utilizes an exemplary signaling protocol to detect the CPD with downlink-channel phase feedback.

In accordance with one or more embodiments, the CPD can be detected via a phase feedback of a downlink channel. FIG. 7 illustrates an example system that utilizes an exemplary signaling protocol to detect the CPD with downlink-channel phase feedback. In FIG. 7, base station 710 comprises downlink-pilot apparatus 512, uplink-channel estimator 514, and CPD detector 716. Mobile user 750 comprises downlink-channel estimator 552, first uplink-pilot apparatus 554, and phase feedback apparatus 756. Downlink-pilot apparatus 512 transmits the downlink-pilot that is received by downlink-channel estimator 552, where the downlink channel $h_{dl}$ is estimated. First uplink-pilot apparatus 554 transmits a first uplink-pilot that is received by uplink-channel estimator 514, where the uplink channel $h_{ul}$ is estimated. Phase feedback apparatus 756 feeds the phase of the estimated downlink channel, $\angle(\hat{h}_{dl})$, back to base station 710 via the uplink channel. CPD detector 716 computes the difference between the phase of estimated uplink channel from uplink-channel estimator 514 and the phase of the estimated downlink channel fed back from phase feedback apparatus 756: $\angle(\hat{h}_{ul})-\angle(\hat{h}_{dl})$. Ignoring the error from channel estimation, the above phase difference equals to Eq. (6), or Eq. (9), depending on whether unequal delays are present in Tx and Rx paths. Thus the theoretical value of the detected CPD obtained from the phase feedback is the same as that obtained from the second uplink-pilot in the foregoing descriptions.

It is to be appreciated that phase feedback apparatus 756 can feedback the downlink channel phase in phasor form $e^{j\angle(\hat{h}_{dl})}$ instead of in phase form $\angle(\hat{h}_{dl})$. The preferred form of feedback may depend on the applications in consideration.

It should be noted that when the CPD between the downlink and uplink channels is constant within the signal spectrum, the number of phases to be fed back can be as few as one. Thus the feedback overhead, and coding/decoding delay can be much smaller than that of the full channel-information feedback required in aforementioned prior art. For example, in an LTE system where there are many narrowband subcarrier channels, the number of pilot subcarriers whose phase need to be fed back can be as low as one for the base station to detect the CPD.

It will be appreciated that, in accordance with one or more aspects described herein, CPD detection can be made with respect to a plurality of frequency points. For example, in an LTE network, either of first and second uplink-pilots can be carried by a plurality of pilot subcarriers, resulting in a plurality of detected CPD values. When multiple detected CPD values are available, they can be combined in various ways according to various criteria so that the combined result is better, or more accurate than any individual detected CPD value.

It is to be understood that while the CPD model in Eqs. (1) and (2) or in Eqs. (8) and (9) is derived based on underlying physical phenomena, it is also applicable in situations where the uplink channel and the downlink channel differ by a complex factor that can be considered to be little changed during one cycle of the signaling protocol, regardless of the underlying physical mechanisms that may have contributed to the difference between the uplink channel and the downlink channel. The phase of the complex factor plays the same role as the CPD, and thus can be detected by the methods or apparatus in the foregoing descriptions.

Multipoint Broadcast or Multipoint Transmission

In a multipoint broadcast or multipoint transmission system, a collaborating base station requires information on downlink channels to compute the pre-coding matrix. Refer to the multipoint broadcast system in FIG. 1. Each collaborating base station will first obtain the information on its own downlink channels to all recipient mobile users. Then all collaborating base stations will exchange the downlink-channel information via high-speed backbone connection 110. After the exchange, each base station will have the same global channel information, i.e., the information on all downlink channels between any collaborating base station and any recipient mobile user.

Figure 8:
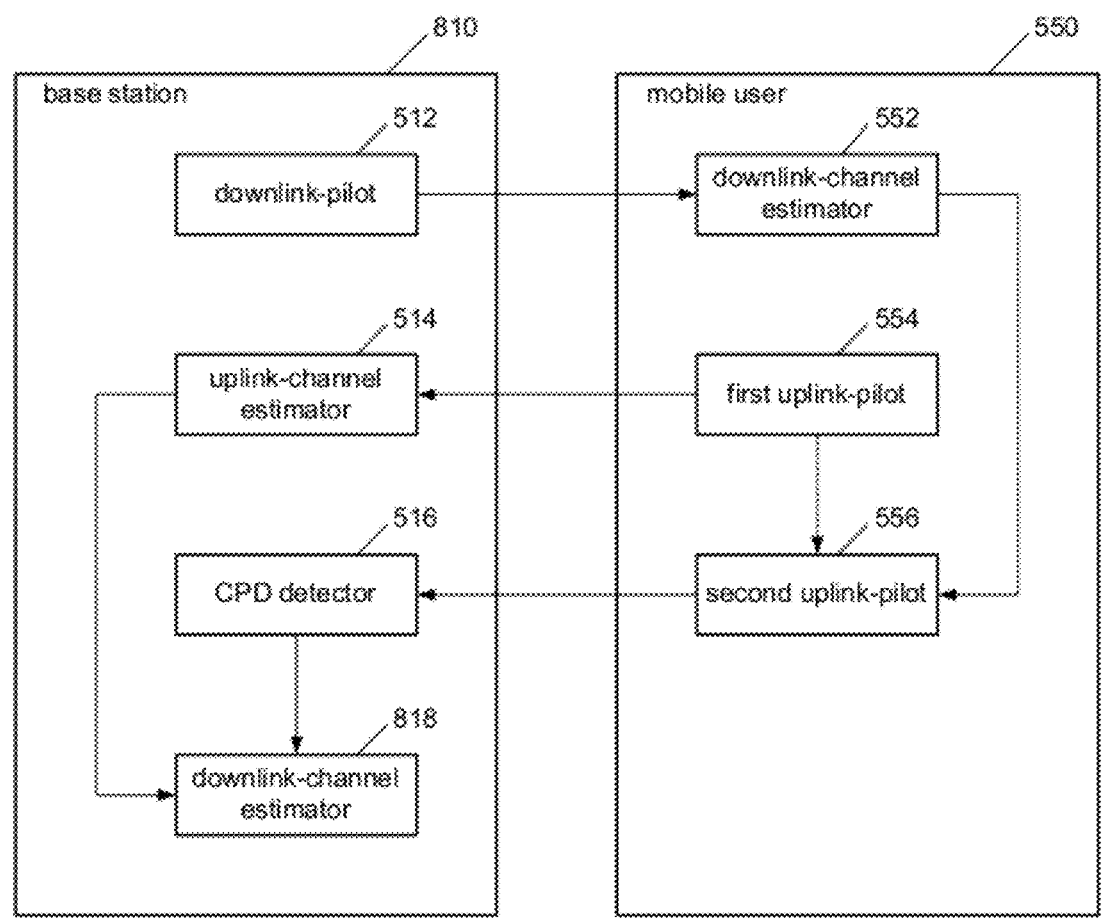
FIG. 8 illustrates an example system for a base station to obtain the downlink-channel information.

FIG. 8 illustrates an example system for a base station to obtain the downlink-channel information. In FIG. 8, base station 810 comprises downlink-pilot apparatus 512, uplink-channel estimator 514, CPD detector 516, and downlink-channel estimator 818. The example system in FIG. 8 detects the CPD in the same way as the example system does in FIG.

5. After detecting the CPD, downlink-channel estimator 818 de-rotates the estimated uplink channel to obtain an estimate of the downlink channel. The example system in FIG. 8 repeats estimation of the downlink channel for each recipient mobile user. Note that mobile users can send the uplink-pilots (first and second) sequentially, or they can send the uplink-pilots simultaneously, with each mobile user using different part of the uplink channel. For example, in an LTE network, mobile uses may use different subsets of pilot subcarriers to send the pilot signals in parallel. Doing so shortens the signaling cycle compared to sending pilot signals sequentially by all mobile users.

Figure 9:
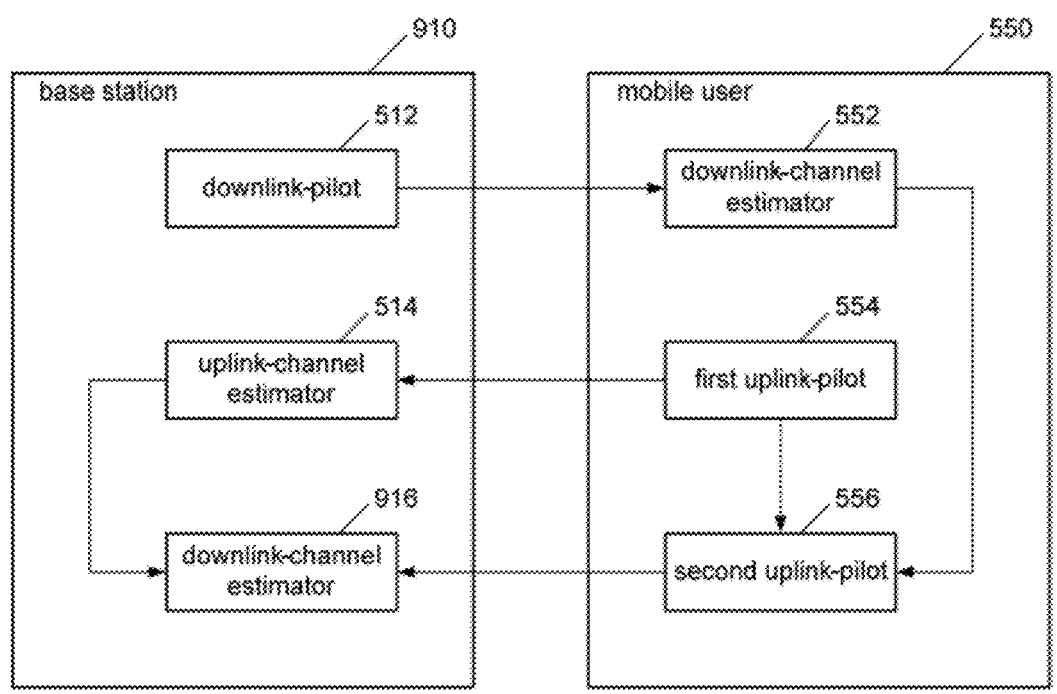
FIG. 9 illustrates an example system that obtains the downlink-channel information without explicitly detecting the CPD.
Figure 10:
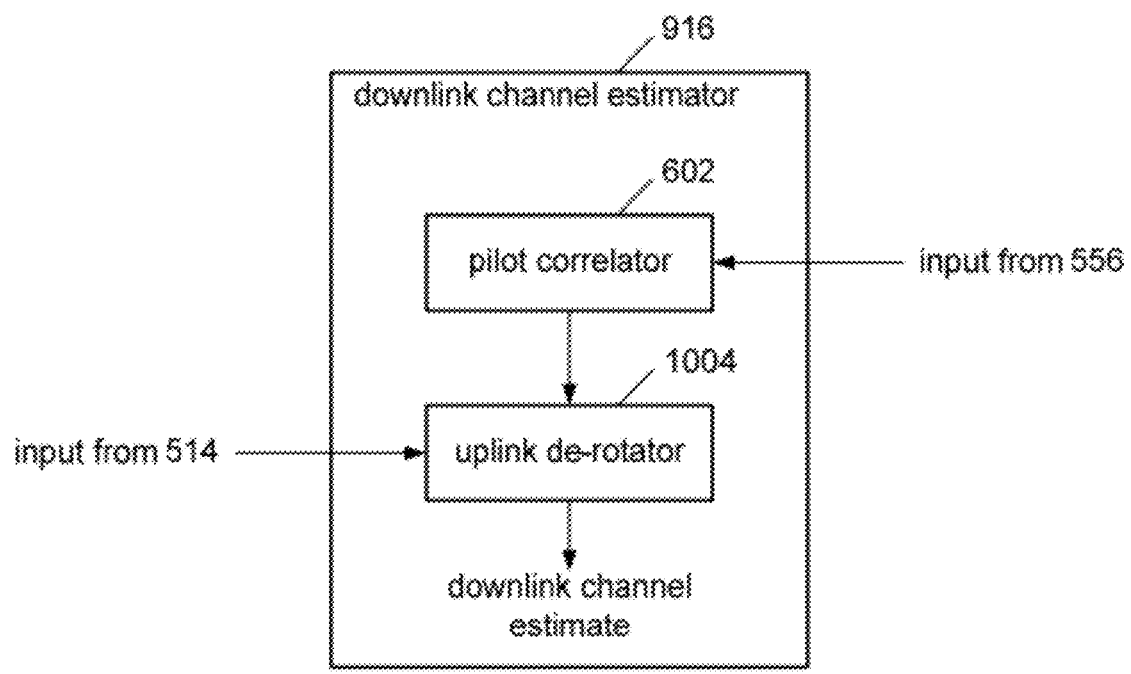
FIG. 10 illustrates an example procedure to estimate the downlink channel without explicitly detecting the CPD.

Alternatively, an example system is illustrated in FIG. 9, which obtains the downlink-channel information without explicitly detecting the CPD. In FIG. 9, base station 910 comprises downlink-pilot apparatus 512, uplink-channel estimator 514, and downlink-channel estimator 916. Downlink-channel estimator 916 combines the uplink-channel estimate, $\hat{h}_{ul}$, from uplink-channel estimator 514 and the received second uplink-pilot signal from second uplink-pilot apparatus 556, to obtain the downlink-channel estimate, $\hat{h}_{dl}$. FIG. 10 illustrates an example procedure to estimate the downlink channel without explicitly detecting the CPD. In FIG. 10, downlink-channel estimator 916 comprises pilot correlator 602 and uplink de-rotator 1004. Pilot correlator 602 removes the second base uplink-pilot. The output of pilot correlator 602 is expressed in Eq. (5). Uplink de-rotator 1004 de-rotates the estimated uplink channel with the phase of the output of pilot correlator 602. This can be expressed mathematically as $$\hat{h}_{ul}\left(\frac{h_{ul}\hat{h}_{dl}^*}{|h_{ul}||\hat{h}_{dl}|}\right)^* = \hat{h}_{ul}\frac{h_{ul}^*\hat{h}_{dl}}{|h_{ul}||\hat{h}_{dl}|} \quad (10)$$

Ignoring the error from the channel estimation, i.e., assuming that $\hat{h}_{dl}=h_{dl}$, $\hat{h}_{ul}=h_{ul}$, and noting that it can be assumed that $|h_{dl}|=|h_{ul}|$, Eq. (10) is simply $h_{dl}$. Therefore the uplink de-rotator 1004 yields the downlink channel $h_{dl}$ after de-rotation.

It should be noted that due to the different gain settings in a base station and a mobile user, it is most likely that $|h_{dl}|=A|h_{ul}|$, where A is a positive constant, and may not always equal to one. However, it is proper to assume $|h_{dl}|=|h_{ul}|$ after calibration and/or scaling are performed in a pair of base station and a mobile user. In a system of multiple base stations and multiple mobile users, such as a multipoint broadcast system, it is also proper to assume $|h_{dl}|=|h_{ul}|$ after calibration and/or scaling are performed for all pairs of a base station and a mobile user in the system, provided that the scaling is consistent with gain settings of all base stations and mobile users in the system.

Figure 11:
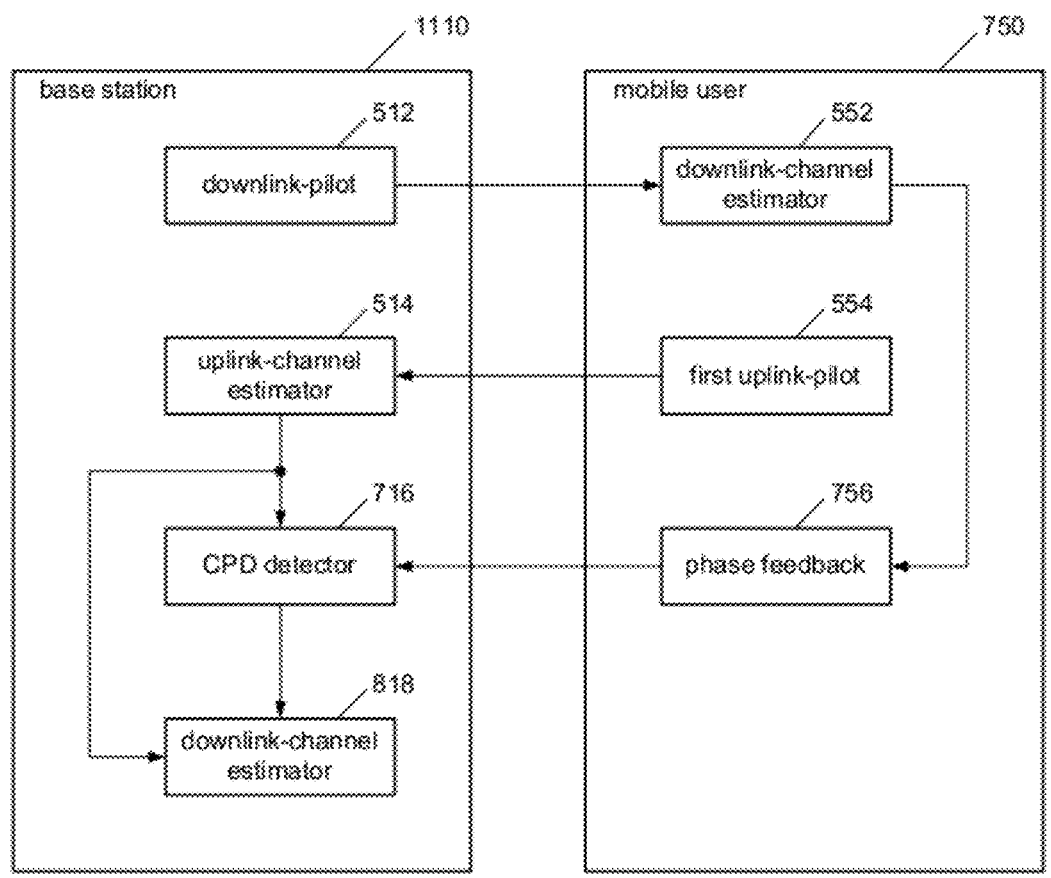
FIG. 11 shows an example system that obtains the downlink-channel information with downlink-channel phase feedback.

In a TDD wireless network, use of second uplink-pilot signal removes the random phase from the uplink-channel information so that the downlink-channel information can be readily recovered. The need for feedback of full downlink-channel information is eliminated, thus keeping the full benefits of multipoint transmissions. Alternatively, the downlink-channel information can also be acquired by feeding back the phase of the downlink channel. As previously mentioned, the number of feedback phases can be as small as one, therefore the feedback overhead and coding/decoding delay can be kept much smaller compared to the feedback of the full downlink channel knowledge. FIG. 11 shows an example system that obtains the downlink-channel information with downlink-channel phase feedback. In FIG. 11, base station 1110 comprises downlink-pilot apparatus 512, uplink-channel estimator 514, CPD detector 716, and downlink-channel estimator 818. CPD detector 716 detects the CPD in the same way as the example system does in FIG. 7. After CPD detection, downlink-channel estimator 818 de-rotates the estimated uplink channel to obtain an estimate of the downlink channel. The example system in FIG. 11 repeats estimation of the downlink channel for each recipient mobile user.

For a pair of a base station and a mobile user in an FDD wireless network, the uplink channel and the downlink channel are different. An FDD network can be modified to a hybrid FDD/TDD network, so the downlink-channel information can be readily made available at collaborating base stations in a multipoint transmission system.

Figure 2:
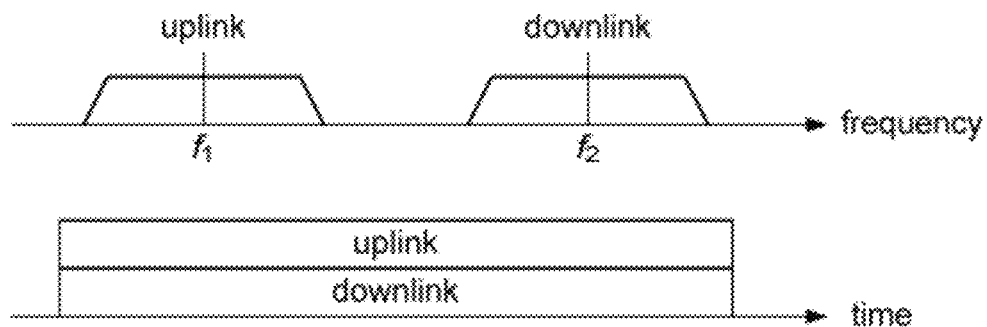
FIG. 2 illustrates the time- and frequency-domain characteristics of an FDD system.
Figure 3:
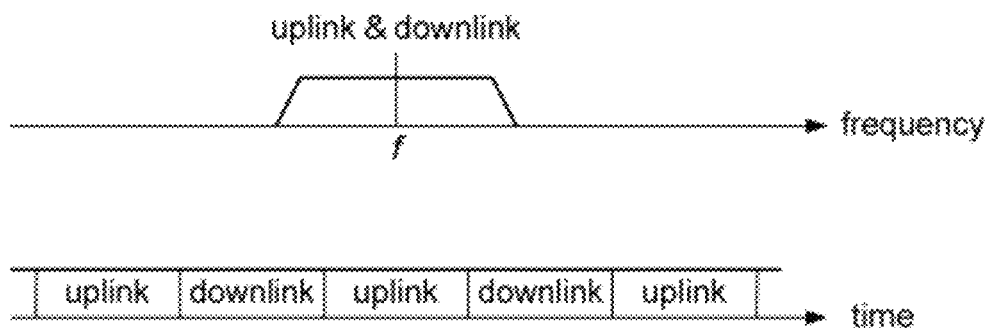
FIG. 3 illustrates the time- and frequency-domain characteristics of a TDD system.
Figure 12:
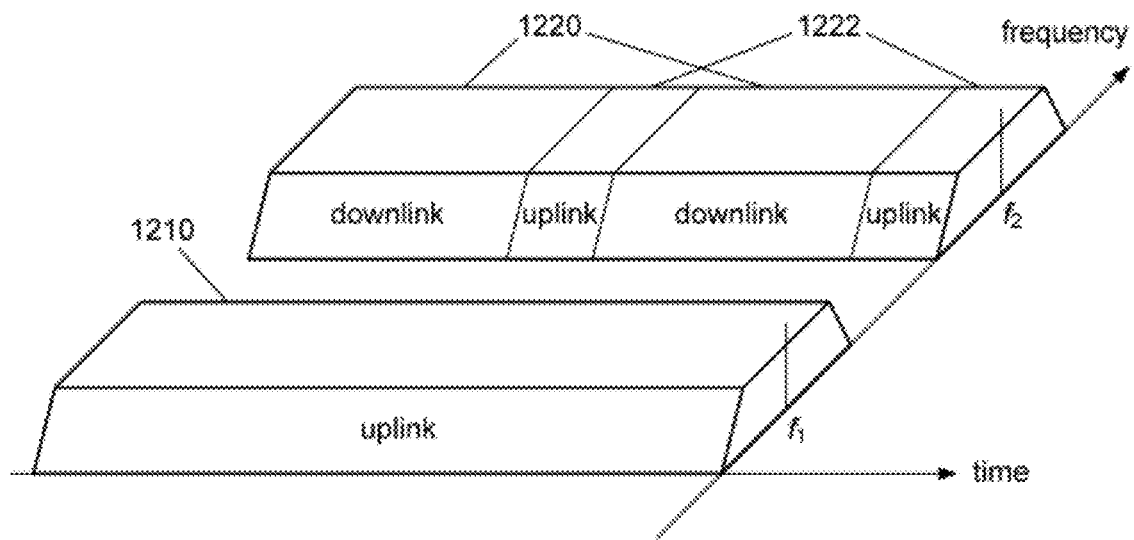
FIG. 12 illustrates an example hybrid FDD/TDD system.

Refer to FIG. 2, an example FDD system assigns a frequency band with a center frequency $f_1$ to uplink, and a frequency band with a center frequency $f_2$ to downlink. FIG. 12 illustrates an example hybrid FDD/TDD system modified from the example FDD system in FIG. 2. In the example system in FIG. 12, the uplink band 1210 remains the same as in FIG. 2. The downlink band, however, is now operating in a TDD fashion. An uplink segment 1222 is inserted in the $f_2$-band, so that uplink segment 1222 shares the $f_2$-band with downlink segment 1220. The purpose of uplink segment 1222 is to provide the necessary signaling, as described hereinabove, for a collaborating base station to acquire the downlink-channel information. The signaling in the uplink segment 1222 may include a first uplink-pilot, a second uplink-pilot, and/or downlink-channel phase feedback.

A hybrid FDD/TDD network retains the benefits of both TDD and FDD. An uplink frequency band allows dedicated uplink transmission, while the uplink segment in the other shared frequency band allows a base station to acquire the downlink channel. If the uplink segment in the shared frequency band is designed to carry the uplink signaling traffic only and not the uplink data traffic, the reduction in the downlink capacity of the network by the added uplink segment can be made to be minimal.

Point-to-Point MIMO System

In a wireless MIMO system, two wireless subsystems, each equipped with multiple antennas, can communicate with each other. A multipoint broadcast system can be considered to be a wireless MIMO system of a special type, in which a set of collaborating base stations constitutes one subsystem, while a set of mobile users constitutes the other subsystem. The antennas in the base station subsystem can be coordinated or jointly processed, whereas the antennas in the mobile-user subsystem cannot be jointly processed, unless the antennas of interest belong to the same mobile user.

Another type of the wireless MIMO system is point-to-point. In a point-to-point wireless MIMO system, the antennas in either subsystem can be coordinated or jointly processed. Because of this additional flexibility, the system throughput of a point-to-point wireless MIMO system is generally better than that of a similarly configured multipoint broadcast system. Note that the antennas of a subsystem in a point-to-point MIMO are not necessarily co-located; they merely possess the ability to collaborate, as co-located antennas typically do.

As aforementioned, the terms "transmit channel" and "receive channel" are used in the following description. For one subsystem, the transmit channel is an MIMO channel that the subsystem uses to transmit data to the other subsystem. The receive channel is an MIMO channel that the subsystem uses to receive data from the other subsystem. Thus the transmit channel and the receive channel of one subsystem is the receive channel and the transmit channel of the other subsystem, respectively. Accordingly, the first and second "uplink"-pilots described hereinabove are referred to as the first and second "receive-channel"-pilots in the context of point-to-point MIMO, the term "receive-channel" being used with respect to the subsystem that is receiving such pilots.

Each subsystem in a point-to-point MIMO will need the transmit-channel information to compute the pre-coding matrix. An MIMO channel at a given frequency is characterized by a channel matrix H, as opposed to a single scalar quantity h for an SISO (single-input, single-output) channel. For example, the channel matrix for a 3×3 (3 transmit antennas and 3 receive antennas) MIMO system has the form $$H = \begin{bmatrix} h_{11} & h_{12} & h_{13} \\ h_{21} & h_{22} & h_{23} \\ h_{31} & h_{32} & h_{33} \end{bmatrix} \quad (11)$$

where $h_{ij}$ is the channel from transmit antenna j to receive antenna i. Thus a 3×3 MIMO system has 3×3=9 scalar channels.

Figure 13:
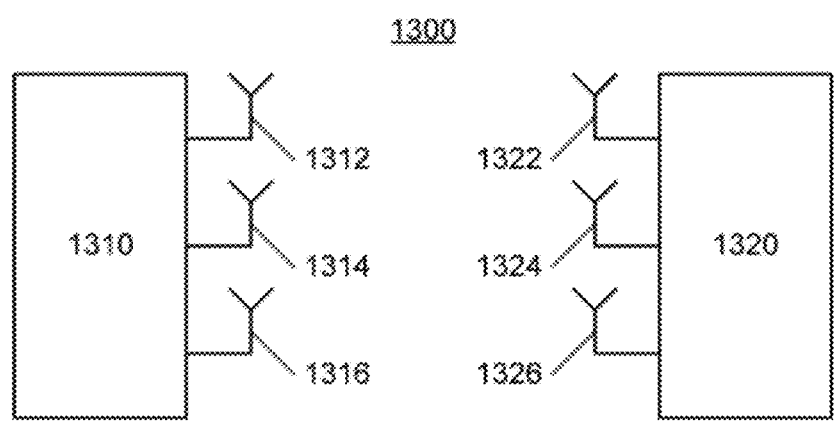
FIG. 13 illustrates an example point-to-point wireless system.

FIG. 13 illustrates an example point-to-point wireless system 1300. Subsystem 1310 has three antennas: 1312, 1314, and 1316. Subsystem 1320 has three antennas: 1322, 1324, and 1326. The MIMO channel between two subsystems 1310 and 1320 consists of nine individual channels. If the duplex pattern of point-to-point wireless system 1300 is TDD or hybrid FDD/TDD, the two subsystems 1310 and 1320 can acquire their respective transmit-channel information without full channel feedback. Subsystem 1310 can acquire information on each of its nine transmit channels in the same way as a base station does in a multipoint broadcast system. Subsystem 1320 can also acquire information on each of its nine transmit channels independent of subsystem 1310. Alternatively, subsystem 1310 can send the CPD value(s) to subsystem 1320, so that subsystem 1320 can use the CPD value(s) and its receive-channel information to acquire its transmit-channel information.

In some point-to-point wireless MIMO systems, the carrier phases of the antennas in each subsystem are synchronized, i.e., the carrier phases either are identical, or have fixed differences among antennas of a subsystem. If both subsystems 1310 and 1320 in the example system 1300 in FIG. 13 are phase-synchronized, the nine CPD values can be considered to correspond to the nine CPD measurements of the same CPD value. These CPD measurements can be combined in various ways according to various criteria so that the combined result is more accurate than any individual detected CPD value. One example is to average the CPD measurements.

Alternatively, a phase-synchronized point-to-point wireless MIMO system can use less signaling to reduce the signaling overhead. For example, instead of transmitting second receive-channel-pilots from all three antennas of subsystem 1320, the system may choose to transmit second receive-channel-pilots from only one antenna, say, antenna 1322.

Phase or Clock Synchronization of System of Wireless Devices

Both multipoint broadcast and point-to-point wireless MIMO can be considered to be a system of wireless devices, where phase or clock synchronization may be needed or desired between sets of wireless devices in the system to improve the system throughput. There may also be a need for phase or clock synchronization in a general system of wireless devices. For example, an ad-hoc wireless sensor network may need all the sensors to be synchronized to a common clock in order to be able to derive the locations and/or speeds of objects under monitoring. Synchronizing all the devices to an external reference, such as GPS reference, can be expensive and complex.

Figure 14:
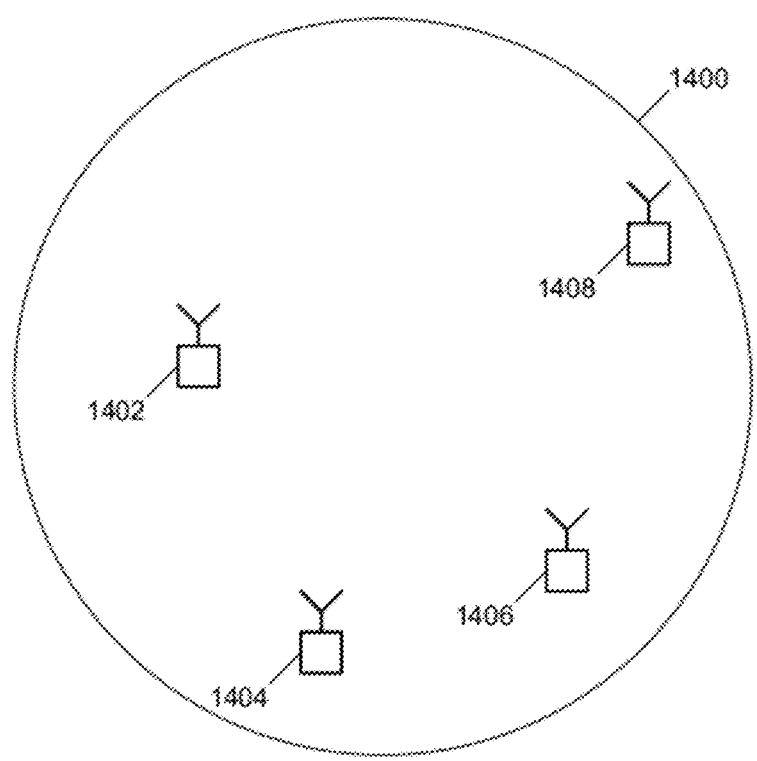
FIG. 14 illustrates an exemplary system of wireless devices that utilizes CPD detection to achieve synchronization.

FIG. 14 illustrates an exemplary system of wireless devices that utilizes CPD detection described hereinabove to achieve synchronization. Four wireless devices, 1402, 1404, 1406, and 1408, are in wireless device system 1400. Without loss of generality, it can be assumed that wireless devices 1404, 1406, and 1408 are to be synchronized to the clock of wireless device 1402. Accordingly, wireless device 1402 is referred to as "reference device", and wireless devices 1404, 1406, and 1408 are referred to as "non-reference devices". It should be noted, however, that a reference device need not be different from or superior to a non-reference device in the system under consideration.

Take wireless device 1404 as an example for synchronization. Wireless device (non-reference device) 1404 and reference device 1402 perform a signaling protocol, as illustrated in FIG. 5, with non-reference device 1404 acting as a base station and reference device 1402 acting as a mobile user. Accordingly, the channel from non-reference device 1404 to reference device 1402 is referred to as the "downlink" channel, and the channel from reference device 1402 to non-reference device 1404 is referred to as the "uplink" channel.

At the end of the signaling protocol, non-reference device 1404 is able to detect the CPD between itself and reference device 1402. Non-reference device 1404 then uses the detected CPD to drive a PLL or FLL circuitry or apparatus so that its clock is phase- or frequency-synchronized with that of reference device 1402. Each of the remaining non-reference devices, 1406 and 1408, follows the same procedure to get synchronized with reference device 1402. The process of signaling between reference device 1402 and non-reference devices 1404, 1406, and 1408 repeats over and over so that the PLL or FLL is continuously driven by new detected CPD values.

Figure 15:
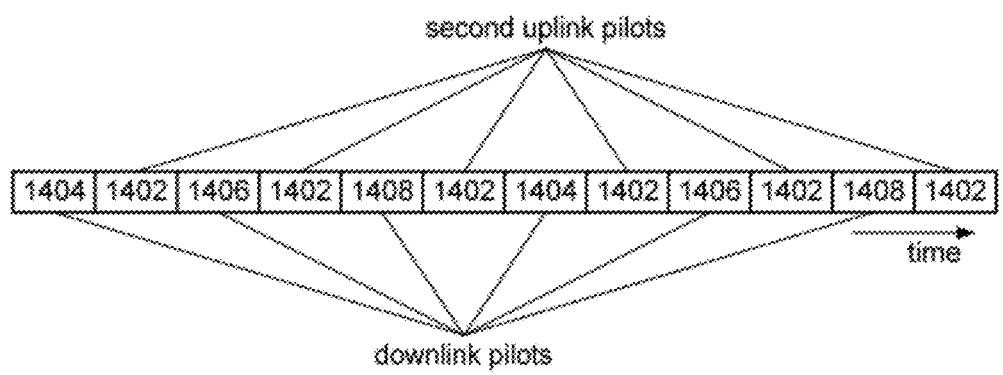
FIG. 15 illustrates an exemplary protocol timing without first uplink-pilots.

It will be appreciated that, in accordance with one or more aspects described herein, if an estimate of the downlink channel or the uplink channel is not needed at a non-reference device for the purpose of synchronization, reference device 1402 need not transmit the first uplink-pilot, thus the first uplink-pilot can be skipped from the signaling protocol. Accordingly, operations of uplink-channel estimator 514 can also be skipped. FIG. 15 shows an exemplary protocol timing without first uplink-pilots.

In FIG. 15, non-reference devices 1404, 1406, and 1408 synchronize to reference device 1402 in a sequential fashion. Alternatively, non-reference devices 1404, 1406, and 1408 can synchronize to reference device 1402 in parallel to shorten the signaling cycle. Particularly, all three non-reference devices, 1404, 1406, and 1408, can send downlink-pilots to reference device 1402 simultaneously. Reference device 1402 estimates the downlink channels from the three downlink-pilot signals, and then sends three second uplink-pilot signals to non-reference devices 1404, 1406, and 1408 via uplink channels. In an LTE system, for example, the uplink-pilot subcarriers can be divided to carry uplink-pilot signals for different mobile users simultaneously.

Alternatively, wireless device 1404 can synchronize with reference device 1402 via phase feedback of the downlink channel. The signaling protocol between wireless device 1404 and reference device 1402 will be the same as the one described in FIG. 7.

The above descriptions illustrate how a non-reference device detects the CPD and synchronizes with the reference device. Alternatively, a reference device can detect the CPDs by reversal of the signaling protocols in foregoing descriptions, and sends the detected CPDs to non-reference devices. Non-reference devices will use their respective CPD values to synchronize with the reference device.

The devices in FIG. 14 can also be synchronized in a "two-at-a-time" fashion. First, device 1404 can be synchronized to device 1402 with device 1402 being a reference device and device 1404 being a non-reference device. Then device 1406 can be synchronized to device 1404 with device 1404 being a reference device and device 1406 being a non-reference device, and so on.

It is to be understood that a reference device may still be synchronized with an external, possibly more accurate and stable, clock reference, such as GPS. This ensures that all wireless devices within the system under consideration are synchronized with the external clock. The advantage is that non-reference devices need only synchronize to a reference device via methods and apparatus described herein, and thus may reduce significantly the cost and complexity that may arise when synchronizing all devices in the system to a high-precision external reference clock.

It will also be appreciated that, in accordance with one or more aspects described herein, a baseband digital PLL or FLL can be used for synchronization within a system of wireless devices. A baseband digital PLL or FLL uses the detected CPD to track the actual phase or frequency difference between device clocks, and compensates the actual phase or frequency difference existed in the received signal, by using various signal processing algorithms, methods, and apparatus, without directly changing the device clock itself. A baseband digital PLL or FLL can be also used in combination with a standard PLL or FLL, such that the standard PLL or FLL removes the main part of the phase or frequency difference, and the baseband digital PLL or FLL tracks and compensates the residual difference. A baseband digital PLL or FLL thus relaxes the requirement, or eliminates the need, for a high-resolution oscillator control unit, which can be expensive and complex.

It is to be understood that when the wireless device network under consideration is a wireless cellular network, a "non-reference" device corresponds to a base station, and a "reference" device corresponds to a mobile user. For a point-to-point wireless MIMO system, one subsystem can be designated as a "non-reference" device and the other subsystem as a "reference" device, or vice versa.

Tracking Time-varying CPD

Because of the noise in the channel, the detected CPD can be noisy. As aforementioned, one way to improve the detection accuracy is to detect CPD at multiple frequency points, and to combine the detected CPD values according to various criteria to reduce the detection noise. Another approach, which can be taken in combination with detection at multiple frequencies, is to combine multiple detected CPD values in time domain. As long as the CPD remains the same or changes very little during the combining period, the detection accuracy can be improved substantially. The time domain combining or averaging is also referred to as filtering, i.e., the time sequence of the detected CPD values passes through a filter to reduce the detection noise. Since the CPD typically changes with time, filtering is a standard way to track a time-varying CPD signal.

One important characteristic of the filtering is the length of the combining period, often referred to as the time constant of the filter. It is often difficult or even impossible for a filter to be able to both minimize the detection noise and track the variation of the CPD. A smaller time constant tracks the time-domain variation better but has poor noise suppression. A larger time constant yields less detection noise but distorts the time variation of the CPD. A model-based CPD tracking can overcome the above shortcomings.

Figure 16:
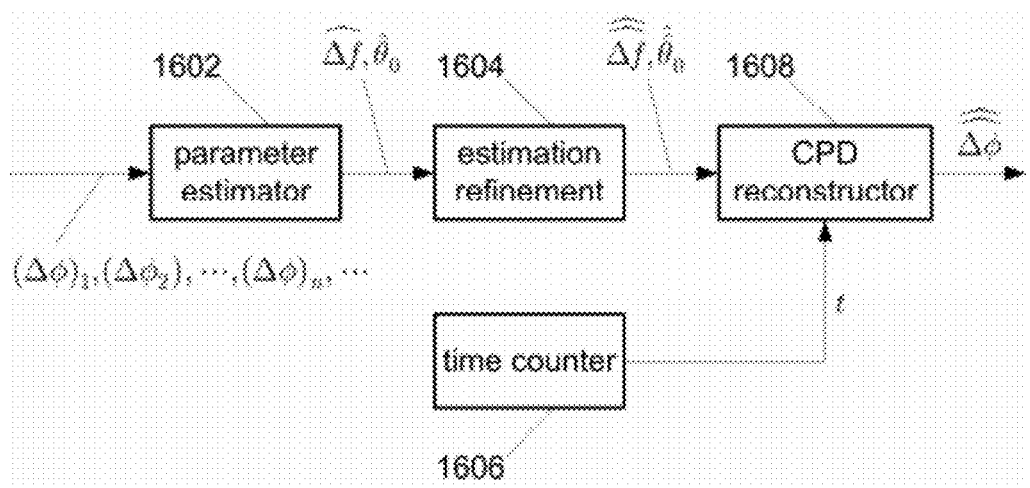
FIG. 16 illustrates an example system that tracks the CPD by using a parametric model for the CPD signal.

In many practical applications, a CPD signal can be modeled with high fidelity as $$\Delta\phi = \phi_b - \phi_m = t\Delta f + \theta_0 \quad (12)$$

where t is the time, and $\Delta f$ and $\theta_0$ are the two parameters in the model, with $\Delta f$ being the frequency difference between two wireless devices and $\theta_0$ being the initial phase of the CPD. FIG. 16 illustrates an example system that tracks the CPD by using the CPD model given by Eq. (12). The example system in FIG. 16 comprises parameter estimator 1602, estimation refinement apparatus 1604, time counter 1606, and CPD reconstructor 1608.

A sequence of consecutively estimated CPD values, $(\Delta\phi)_1$, $(\Delta\phi)_2, \ldots, (\Delta\phi)_n, \ldots$, is passed to parameter estimator 1602 that estimates parameters $\Delta f$ and $\theta_0$. Estimation refinement apparatus 1604 further refines parameter estimates, $\widehat{\Delta f}$ and $\hat{\theta}_0$, and outputs the refined estimates, $\widetilde{\Delta f}$ and $\tilde{\theta}_0$. The refinement in estimation refinement apparatus 1604 may involve combining several estimates of a parameter, including averaging and filtering. When no refinement is made in estimation refinement apparatus 1604, $\widetilde{\Delta f} = \widehat{\Delta f}$ and $\tilde{\theta}_0 = \hat{\theta}_0$. Time counter 1606 keeps the timing information and provides the timing t to CPD reconstructor 1608. CPD reconstructor 1608 reconstructs the CPD value based on the model in Eq. (12):

$$\widetilde{\Delta\phi} = t\widetilde{\Delta f} + \tilde{\theta}_0 \quad (13)$$

It is to be understood that the example system in FIG. 16 may operate on the phase form of the input CPD sequence, $(\Delta\phi)_1, (\Delta\phi)_2, \ldots, (\Delta\phi)_n, \ldots$, as described above, but it may also operate on the phasor form of the input CPD sequence, i.e., $e^{jk(\Delta\phi)_1}, e^{jk(\Delta\phi)_2}, \ldots, e^{jk(\Delta\phi)_n}, \ldots$, where k is a constant. The output of CPD reconstruction can also be either in phase form or in phasor form. Many standard algorithms, methods, and apparatus exist that estimate the frequency and the initial phase, or functions of the frequency and the initial phase, from a set of observations of CPD phases or phasors, and can be used in parameter estimator 1602.

Using model-based CPD tracking can have many advantages. First, tracking a random signal that originates from a known parametric model can be much simpler and more reliable than tracking an unstructured random signal, especially when the number of parameters in the signal model is limited. Second, the parameters in the model are generally varying much more slowly than the random signal itself, therefore they can be estimated more accurately using more observations over longer period of time. Consequently, the reconstructed CPD can be made more accurate as well. Third, the parametric model in Eqs. (12) and (13) makes it possible to make accurate and reliable predictions. In contrast, the prediction based on tracking an unstructured random signal can be very unreliable. The ability to make accurate predictions can be highly desired since a predicted future value can (a) compensate the delays due to signal processing, including filtering, and (b) enable certain algorithms, methods, and apparatus for signal tracking that would otherwise be not feasible. Fourth, model-based CPD tracking can be used in combination with a digital baseband PLL or FLL, so that the requirement for high-precision, high resolution oscillator controls can be further relaxed or eliminated.

Conclusion, Ramifications, and Scope

Accordingly, it will be seen that carrier-phase difference (CPD) detection of various embodiments provides a simple and cost effective way to measure the CPD between two wireless devices by utilizing simple signaling protocols.

In a multipoint broadcast system, CPD detection enables base stations to acquire downlink-channel information without expensive channel information feedback by mobile users, thus retaining the full benefits of multipoint broadcast system.

In a point-to-point MIMO system, CPD detection enables both subsystems to acquire transmit-channel information without full channel-feedback. This allows the point-to-point MIMO system to significantly improve data throughput via joint-processing including pre-coding at both subsystems.

In a general system of wireless devices, CPD detection enables the devices in the system to phase- or frequency-synchronize their clocks, thus eliminating or reducing the cost of having to synchronizing to an external, high-precision reference clock.

A time-varying CPD signal can be more reliably and accurately estimated and tracked via a parametric model, so that elements of various aspects and embodiments, which utilize the CPD, benefit from improved signal quality of the CPD.

It is to be understood that various aspects and/or embodiments described herein can be implemented individually or in any suitable combination thereof. For example, tracking a time-varying CPD signal can be used to provide a continuous detected CPD signal to a multipoint broadcast system. As another example, the two subsystems in a point-to-point MIMO system can be phase- or frequency-synchronized using CPD detection.

It is to be understood that the claimed subject matter herein is not limited to TDD and hybrid FDD/TDD networks. For example, various aspects or features described herein can be applied to the concept of single-frequency, full-duplex wireless communications. It is also to be understood and appreciated that claimed subject matter herein is not limited to wireless networks. For example, a vectored DSL (digital subscriber line) system can be similarly modeled as a multipoint transmission system. Thus the downlink channel or the transmit channel acquisition can be achieved in the same way as described in this application. As another example, a system of devices connected by cables or fibers can also synchronize their clocks using similar signaling protocols described herein via the wired connection.

Various aspects or features described herein can be implemented as a method and/or apparatus using standard programming and/or engineering techniques. Further, the steps and/or actions of a method or algorithm described in connection with the aspects disclosed herein can be embodied directly in hardware, in software modules executed by a set of processors, or in a combination of the two.

For a software implementation, the steps or actions of a method or algorithm can reside as at least one or any combination or set of codes or instructions on tangible media, such as floppy diskettes, hard drives, CD-ROMs, CD-R/Ws, DVDs, memories, or any other machine-loadable storage media, which can be incorporated into a computer program product.

For a hardware implementation, the steps or actions of a method or algorithm can be implemented or performed within one or more devices, such as ASICs, DSPs, FPGAs, discrete gate or transistor logic, discrete hardware components, general purpose processors, controllers, microcontrollers, microprocessors, state machines, other electronic units designed to perform the functions described herein, or a combination thereof.

What has been described above includes examples of aspects of the claimed subject matter. These examples should not be construed as limiting the scope of the embodiments but as merely providing illustrations of some of several embodiments. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims and their legal equivalents.

What is claimed is:

1. A method for communications in a network having at least one reference device and at least one non-reference device, comprising:
    (a) sending a downlink-pilot signal via a downlink channel from said non-reference device to said reference device,
    (b) generating a downlink-channel estimate at said reference device from said downlink-pilot signal,
    (c) sending at least one uplink signal from a set of uplink signals from said reference device to said non-reference device, said uplink signal set comprising a plurality of said uplink signals including a first uplink-pilot and a second uplink-pilot, at least one of said uplink signals consisting of a phase information of said downlink-channel estimate at said reference device, and
    (d) evaluating a carrier-phase difference (CPD) from said phase information of said downlink-channel estimate in said uplink signals received by said non-reference device,
whereby said non-reference device will have the value of said CPD.

2. The method of claim 1, wherein:
    (a) said second uplink-pilot is a second base uplink-pilot de-rotated by the phase of said downlink-channel estimate at said reference device, and
    (b) said second uplink-pilot is sent to said non-reference device for evaluating said CPD.

3. The method of claim 2, wherein evaluating said CPD further comprises:
    (a) removing said second base uplink-pilot from said second uplink-pilot at said non-reference device, and
    (b) detecting CPD from the phase of said second uplink-pilot with said second base uplink-pilot removed.

4. The method of claim 2, wherein said second base uplink-pilot is the same as said first uplink-pilot.

5. The method of claim 1, wherein said set of uplink signal set comprises said first uplink-pilot and at least one downlink-channel phase, and said first uplink-pilot and said downlink-channel phase are sent to said non-reference device for evaluating said CPD.

6. The method of claim 5, wherein evaluating said CPD further comprises:
    (a) generating an uplink-channel estimate at said non-reference device from said first uplink-pilot, and
    (b) evaluating said CPD from said uplink-channel estimate and said downlink-channel phase,
whereby said non-reference device will have the value of said CPD.

7. The method of claim 1, further comprising:
    (a) generating an uplink-channel estimate at said non-reference device of said network from said uplink signals, and
    (b) generating a downlink-channel estimate at non-reference device from said CPD and said uplink-channel estimate,
whereby said non-reference device will have said downlink-channel estimate.

8. The method of claim 7, wherein said network is a multipoint broadcast system, said non-reference device is a base station and said reference device is a mobile user, further comprising:
   (a) repeating steps for generating said downlink-channel estimate from said CPD and said uplink-channel estimate as many times as required until said base station has said downlink-channel estimates with respect to all said mobile users in said multipoint broadcast system,
   (b) exchanging said downlink-channel estimates among said base stations via a backbone network, thereby all said base stations having all said downlink-channel estimates at the end of exchange, and
   (c) computing a pre-coding matrix from said downlink-channel estimates,
whereby said pre-coding matrix will be used in said multipoint broadcast system.

9. The method of claim 7, wherein said network is a point-to-point wireless multi-input, multi-output system having a first subsystem and a second subsystem, further comprising running twice the steps for generating said downlink-channel estimate at said non-reference device, such that
   (a) in the first repetition said first subsystem is designated as said non-reference device and said second subsystem is designated as said reference device, whereby said first subsystem will have said downlink-channel estimate as a transmit-channel estimate, and
   (b) in the second repetition said first subsystem is designated as said reference device and said second subsystem is designated as said non-reference device, whereby said second subsystem will have said downlink-channel estimate as a transmit-channel estimate.

10. The method of claim 1, wherein said network is a point-to-point wireless multi-input, multi-output system having a first subsystem and a second subsystem, said first subsystem and second subsystem being said non-reference device and reference device, respectively, further comprising:
   (a) generating an uplink-channel estimate at said non-reference device from said uplink signals,
   (b) generating a downlink-channel estimate at said non-reference device from said CPD and said uplink-channel estimate, said downlink-channel estimate at said non-reference device being a transmit-channel estimate of said first subsystem,
   (c) sending said CPD via said downlink channel from said non-reference device to said reference device, and
   (d) generating an uplink-channel estimate at said reference device from said CPD and said downlink-channel estimate at said reference device, said uplink-channel estimate at said reference device being a transmit-channel estimate of said second subsystem,
whereby both said first subsystem and said second subsystem will have said transmit-channel estimates.

11. The method of claim 1, further comprising:
   (a) synchronizing the clock of said non-reference device to the clock of said reference device with said CPD, and
   (b) repeating steps for clock synchronization as many times as required until all said non-reference devices are synchronized to said reference device.

12. The method of claim 11, wherein synchronizing the clock further comprises synchronizing in phase with a phase-lock loop.

13. The method of claim 11, wherein synchronizing the clock further comprises synchronizing in frequency with a frequency-lock loop.

14. The method of claim 1, wherein the duplex pattern of said network is time-division duplex.

15. The method of claim 1, wherein the duplex pattern of said network is hybrid of time-division duplex and frequency-division duplex.

16. An apparatus for a communications network having at least one reference device and at least one non-reference device, comprising:
   (a) a downlink-pilot transmitter at said non-reference device for sending a downlink-pilot signal via a downlink channel from said non-reference device to said reference device,
   (b) a downlink-channel estimator at said reference device for generating a downlink-channel estimate at said reference device from said downlink-pilot signal,
   (c) a set of at least one uplink transmitter at said reference device for sending at least one uplink signal from an uplink signal set from said reference device to said non-reference device, said uplink signal set comprising a plurality of said uplink signals including a first uplink-pilot and a second uplink-pilot, at least one of said uplink signals consisting of a phase information of said downlink-channel estimate at said reference device, and
   (d) a carrier-phase difference (CPD) detector at said non-reference device for evaluating said CPD at said non-reference device from said phase information of said downlink-channel estimate in said uplink signals,
whereby said CPD detector will provide detected CPD values to said non-reference device.

17. The apparatus of claim 16, wherein:
   (a) said second uplink-pilot is a second base uplink-pilot de-rotated by the phase of said downlink-channel estimate at said reference device, and
   (b) said set of uplink transmitters at said reference device comprises a second uplink-pilot transmitter that transmits said second uplink-pilot to said non-reference device for said CPD detector to evaluate said CPD.

18. The apparatus of claim 17, wherein said CPD detector first removes said second base uplink-pilot from said second uplink-pilot, then detects said CPD from the phase of said second uplink-pilot with said second base uplink-pilot removed.

19. The apparatus of claim 17, wherein said second base uplink-pilot is the same as said first uplink-pilot.

20. The apparatus of claim 16, wherein:
   (a) said uplink signal set comprises said first uplink-pilot and at least one downlink-channel phase,
   (b) said set of uplink transmitters at said reference device comprises a first uplink-pilot transmitter and a downlink-channel phase transmitter, and
   (c) said first uplink-pilot transmitter sends said first uplink-pilot, and said downlink-channel phase transmitter sends said downlink-channel phase, to said non-reference device for said CPD detector to evaluate said CPD.

21. The apparatus of claim 20, further comprising an uplink-channel estimator at said non-reference device for generating an uplink-channel estimate for said CPD detector to evaluate said CPD.

22. The apparatus of claim 21, wherein said CPD detector detects said CPD from said uplink-channel estimate and said downlink-channel phase.

23. The apparatus of claim 16, further comprising:
   (a) an uplink-channel estimator at said non-reference device of said network for generating an uplink-channel estimate, and
   (b) a downlink-channel estimator at said non-reference device for generating an downlink-channel estimate from said CPD and said uplink-channel estimate at said non-reference device.

24. The apparatus of claim 23, wherein said network is a multipoint broadcast system, said non-reference device is a base station and said reference device is a mobile user, further comprising:
- (a) a first controller for repeating operations for generating said downlink-channel estimate from said CPD and said uplink-channel estimate as many times as required until said base station has said downlink-channel estimates with respect to all said mobile users in said multipoint broadcast system,
- (b) a backbone network,
- (c) a second controller for causing all said base stations in said multipoint broadcast system to exchange said downlink-channel estimates via said backbone network, thereby all said base stations having all said downlink-channel estimates at the end of exchange, and
- (d) a computer processor for computing a pre-coding matrix from said downlink-channel estimates, whereby said pre-coding matrix will be used in said multipoint broadcast system.

25. The apparatus of claim 23, wherein said network is a point-to-point wireless multi-input, multi-output system having a first subsystem and a second subsystem, further comprising a signaling-protocol controller for causing operations running twice for generating said downlink-channel estimate at said non-reference device, such that
- (a) in the first repetition said first subsystem is designated as said non-reference device and said second subsystem is designated as said reference device, whereby said first subsystem will have said downlink-channel estimate as a transmit-channel estimate, and
- (b) in the second repetition said first subsystem is designated as said reference device and said second subsystem is designated as said non-reference device, whereby said second subsystem will have said downlink-channel estimate as a transmit-channel estimate.

26. The apparatus of claim 16, wherein said network is a point-to-point wireless multi-input, multi-output system having a first subsystem and a second subsystem, said first subsystem and second subsystem being said non-reference device and reference device, respectively, further comprising:
- (a) an uplink-channel estimator at said non-reference device for generating an uplink-channel estimate from said uplink signals,
- (b) a downlink-channel estimator at said non-reference device for generating a downlink-channel estimate from said CPD and said uplink-channel estimate, said downlink-channel estimate at said non-reference device being a transmit-channel estimate of said first subsystem,
- (c) a CPD transmitter at said non-reference device for sending said CPD via said downlink channel to said reference device, and
- (d) an uplink-channel estimator at said reference device for generating an uplink-channel estimate from said CPD and said downlink-channel estimate at said reference device, said uplink-channel estimate at said reference device being a transmit-channel estimate of said second subsystem, whereby both said first subsystem and said second subsystem will have said transmit-channel estimates.

27. The apparatus of claim 16, further comprising:
- (a) a synchronization module at said non-reference device for synchronizing the clock of said non-reference device to the clock of said reference device with said CPD, and
- (b) a signaling-protocol controller for repeating operations for clock synchronization as many times as required until all said non-reference devices are synchronized to said reference device.

28. The apparatus of claim 27, wherein said synchronization module further comprises a phase-lock loop module.

29. The apparatus of claim 27, wherein said synchronization module further comprises a frequency-lock loop module.

30. The apparatus of claim 16, wherein the duplex pattern of said network is time-division duplex.

31. The apparatus of claim 16, wherein the duplex pattern of said network is hybrid of time-division duplex and frequency-division duplex.

* * * * *